US012679547B2

(12) United States Patent (10) Patent No.: US 12,679,547 B2

Chamberland et al. (45) Date of Patent: Jul. 14, 2026

(54) PARACHUTE SYSTEMS AND ENERGY ATTENUATING DROGUE SYSTEMS THEREOF

(71) Applicant: AMI Industries, Inc., Colorado Springs, CO (US)

(72) Inventors: Joseph Chamberland, Marion, IA (US); Tyler Esposito, Enfield, CT (US); Akash Mukherjee, Plano, TX (US); Talyn Meyer, Marion, IA (US); Osvaldo Sanchez, McKinney, TX (US); John L. Hampton, Bradenton, FL (US); Christopher Ian Rolland, Colorado Springs, CO (US); Bradley Mastrolia, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 64 days.

(21) Appl. No.: 18/658,160

(22) Filed: May 8, 2024

(65) Prior Publication Data

US 2025/0346357 A1 Nov. 13, 2025

(51) Int. Cl.
B64D 17/36 (2006.01)
B64D 17/24 (2006.01)
B64D 25/10 (2006.01)

(52) U.S. Cl.
CPC ............. B64D 17/36 (2013.01); B64D 17/24 (2013.01); B64D 25/10 (2013.01)

(58) Field of Classification Search
CPC ................................ B64D 17/36; B64D 17/24
See application file for complete search history.

(56) References Cited

U.S. PATENT DOCUMENTS

| | | | | | |
|---|---|---|---|---|---|
| 2,458,264 | A | * | 1/1949 | Hart ...................... | B64D 17/00 244/152 |
| 4,022,406 | A | * | 5/1977 | Matsuo .................. | B64D 17/34 244/152 |
| 4,493,466 | A | * | 1/1985 | Trenholm .............. | B64D 17/24 244/148 |
| 5,472,155 | A | * | 12/1995 | Mastrolia ............... | B64D 17/24 87/8 |
| 6,220,547 | B1 | * | 4/2001 | Smith .................. | B64D 17/025 244/152 |
| 9,809,315 | B2 | * | 11/2017 | Hampton ............... | B64D 17/24 |
| 11,286,052 | B2 | * | 3/2022 | Holstine ............... | B64D 17/36 |
| 11,618,577 | B2 | * | 4/2023 | Wimmer ............... | B64D 17/62 244/122 A |
| 12,157,576 | B2 | * | 12/2024 | Thistlethwaite .......... | F16F 7/14 |
| 2021/0269165 | A1 | * | 9/2021 | Volny .................... | B64D 17/26 |

FOREIGN PATENT DOCUMENTS

| | | | | |
|---|---|---|---|---|
| CN | 117360781 A | | 1/2024 | |
| FR | 2676985 A1 | * | 12/1992 | ........... B64C 31/036 |
| GB | 667032 A | | 2/1952 | |

* cited by examiner

*Primary Examiner* — Justin M Benedik

(74) *Attorney, Agent, or Firm* — CANTOR COLBURN LLP

(57) ABSTRACT

Drogue parachute systems include an ejection seat, an elastic riser operably connected to the ejection seat at a first end and a riser connection is arranged at a second end of the elastic riser, a set of suspension lines operably connected to the riser connection, and a drogue canopy attached to the set of suspension lines opposite the riser connection.

20 Claims, 5 Drawing Sheets

PARACHUTE SYSTEMS AND ENERGY ATTENUATING DROGUE SYSTEMS THEREOF

BACKGROUND

The subject matter disclosed herein generally relates to parachute systems and, more particularly, to energy attenuating drogue mechanism for parachute systems.

Aircraft may be equipped with ejection systems for ejecting a pilot or occupant (user) from the aircraft upon activation of the ejection system. For example, during ejection events, an ejection seat may be propelled from an aircraft cockpit. The ejection seats may include parachute systems configured to reduce the velocity of the ejection seat and its occupant and deliver the seat and/or the occupant safely to land or sea. The parachute systems may include a drogue parachute, which may deploy rapidly in response to expulsion of the ejection seat from the cockpit. The drogue parachute may decelerate and stabilize the ejection seat to enable safe deployment of a main parachute.

Drogue parachutes typically comprise a canopy, risers, and suspension lines. The canopy may increase drag, the suspension lines may connect the canopy to the risers, and the risers may attach the parachute to the person (e.g., harness) and/or object (e.g., ejection seat) being ejected. Drogue parachutes may be configured to partially or fully inflate at a reefed stage, followed by full inflation. During initial inflation, a rapid increase, or "spike," in force is exerted on the seat attached to the drogue risers. The rate of change in force during the spike can lead to injury and/or other damage to the user and/or components of the system. Accordingly, it may be beneficial to have improved drogue systems and mechanisms to minimize the spike and/or reduce the forces applied to the user and system, whether directly connected to the parachute system or indirectly through a seat or the like.

SUMMARY

According to some embodiments, drogue parachute systems are provided. The drogue parachute systems include an ejection seat, an elastic riser operably connected to the ejection seat at a first end and a riser connection is arranged at a second end of the elastic riser, a set of suspension lines operably connected to the riser connection, and a drogue canopy attached to the set of suspension lines opposite the riser connection.

In addition to one or more of the features described herein, or as an alternative, further embodiments of the drogue parachute systems may include that the elastic riser is formed from kinetic rope.

In addition to one or more of the features described herein, or as an alternative, further embodiments of the drogue parachute systems may include that the elastic riser is formed from bungee cord material or bungee jumping cord material.

In addition to one or more of the features described herein, or as an alternative, further embodiments of the drogue parachute systems may include that the elastic riser is configured to extend from a first length to a second length during deployment of the drogue canopy.

In addition to one or more of the features described herein, or as an alternative, further embodiments of the drogue parachute systems may include that the second length is a length that is at least 15% greater than the first length.

In addition to one or more of the features described herein, or as an alternative, further embodiments of the drogue parachute systems may include that the elastic riser is operably connected to the ejection seat via an aramid fiber cable.

In addition to one or more of the features described herein, or as an alternative, further embodiments of the drogue parachute systems may include that the elastic riser is operably connected to the set of suspension lines via an aramid fiber cable.

In addition to one or more of the features described herein, or as an alternative, further embodiments of the drogue parachute systems may include a drogue parachute attenuation system disposed between and connecting the elastic riser to the ejection seat.

In addition to one or more of the features described herein, or as an alternative, further embodiments of the drogue parachute systems may include that the drogue parachute attenuation system comprises at least one attenuation element connected between the ejection seat and the elastic riser.

In addition to one or more of the features described herein, or as an alternative, further embodiments of the drogue parachute systems may include that the drogue parachute attenuation system includes an attenuator bushing attached to the ejection seat and an attenuator coupling attached to the elastic riser. The at least one attenuation element extends between the attenuator bushing and the attenuator coupling.

In addition to one or more of the features described herein, or as an alternative, further embodiments of the drogue parachute systems may include that the drogue parachute attenuation system further includes a first connector configured to attach the attenuator bushing to the at least one attenuation element and a second connector configured to attach the at least one attenuation element to the attenuator coupling.

In addition to one or more of the features described herein, or as an alternative, further embodiments of the drogue parachute systems may include that the at least one attenuation element is made of kinetic rope.

In addition to one or more of the features described herein, or as an alternative, further embodiments of the drogue parachute systems may include that the at least one attenuation element is made of bungee cord material or bungee jumping cord material.

According to some embodiments, drogue parachute systems are provided. The drogue parachute systems include an ejection seat, a riser, a set of suspension lines, a drogue canopy, wherein the drogue canopy is attached at a first end of the set of suspension lines and the riser is attached to a second end of the suspension lines, and a drogue parachute attenuation system arranged between the riser and the ejection seat. The drogue parachute attenuation system includes an attenuator bushing attached to the ejection seat, an attenuator coupling attached to the riser, and at least one attenuator element attached between the attenuator bushing and the attenuator coupling.

In addition to one or more of the features described herein, or as an alternative, further embodiments of the drogue parachute systems may include that the at least one attenuator element is formed from kinetic rope.

In addition to one or more of the features described herein, or as an alternative, further embodiments of the drogue parachute systems may include that the at least one attenuator element is formed from bungee cord material or bungee jumping cord material.

In addition to one or more of the features described herein, or as an alternative, further embodiments of the drogue parachute systems may include that the at least one attenuator element comprises a plurality of cables.

In addition to one or more of the features described herein, or as an alternative, further embodiments of the drogue parachute systems may include that the drogue parachute attenuation system further includes a first connector configured to attach the attenuator bushing to the at least one attenuation element and a second connector configured to attach the at least one attenuation element to the attenuator coupling.

In addition to one or more of the features described herein, or as an alternative, further embodiments of the drogue parachute systems may include that the riser is made of kinetic rope.

In addition to one or more of the features described herein, or as an alternative, further embodiments of the drogue parachute systems may include that the riser is made of bungee cord material or bungee jumping cord material.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
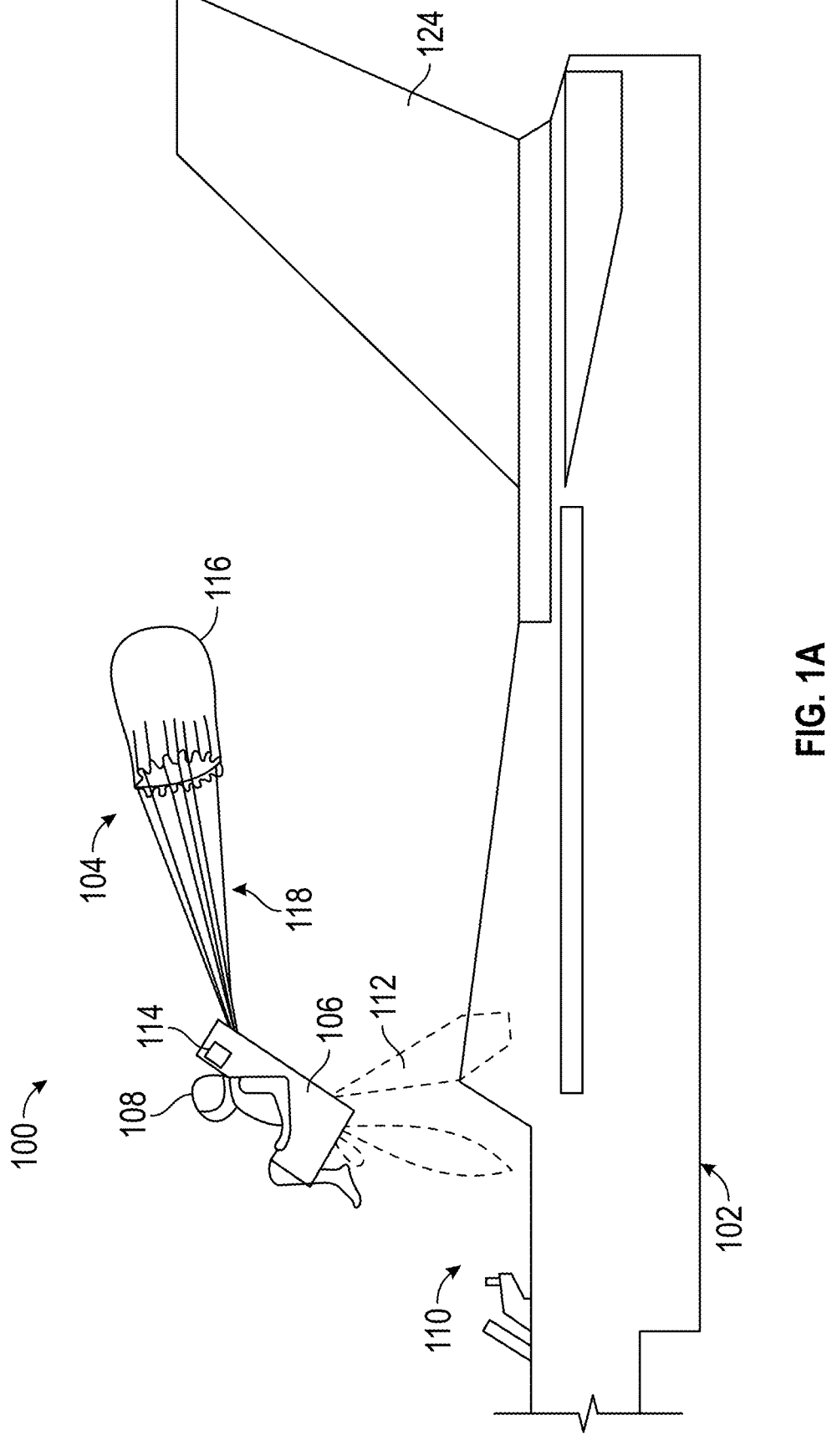
FIG. 1A is a schematic illustration of a drogue parachute system that may incorporate embodiments of the present disclosure.

Parachutes are used as safety devices for crew or other users (e.g., flight crew, pilots) to provide a mechanism to safely return a user to the Earth's surface (land or sea), such as from an ejection from an aircraft. During deployment of a parachute, the human body is subjected to various forces which are applied to the human body, through a harness or seat which are connected to a parachute. The harness or seat may include one or more attachment points for attaching to risers or a bridle that connect to suspension lines, which in turn connect to a parachute canopy. The parachute canopy may be deployed, in part, by operation of a drogue parachute.

That is, parachute systems may include a drogue parachute which may deploy rapidly in response to expulsion of an ejection seat from a cockpit of an aircraft. The drogue parachute may decelerate and stabilize the ejection seat to enable safe deployment of a main parachute. Drogue parachutes typically comprise a canopy, risers, and suspension lines. The canopy may increase drag, the suspension lines may connect the canopy to the risers, and the risers may attach the parachute to the person (e.g., harness) and/or object (e.g., ejection seat) being ejected. Drogue parachutes may be configured for staged deployment. For example, at a first deployment stage, the drogue parachute is reefed and the drogue canopy inflates to a first diameter, which may be relatively small to reduce opening loads. Subsequently, at a second deployment stage, the reefing line is cut and the drogue canopy inflates to a second, larger diameter. The rate of change in force during the inflation load spike can lead to injury and/or other damage to the users and/or components of the system.

For example, during high-speed ejections, acceleration can exceed injurious limits, with peak acceleration occurring at an initial drogue opening shock (e.g., 0.02 to 0.05 second duration). The shock loads increase as ejection airspeed increases. Due to the shock loads, a user (e.g., aircrew, pilot, etc.) will be subject to high loads which may result in injury to the user's neck and torso. As aircraft are developed with high speeds, improved systems are required to address the increase in loads that a user may experience during an ejection event.

Current systems for ejection seats use aramid fiber (e.g., KEVLAR®) risers for high strength and to accommodate the forces and loads during an ejection event. The user of aramid fiber risers may also provide an added benefit of low packing volume while providing a high strength solution. Although such aramid fiber risers have high strength to support high loads, these risers are subject to limited shock absorption during loading. In view of this, embodiments of the present disclosure are directed to risers that provide both high strength and shock absorption. In accordance with some embodiments of the present disclosure, a riser is configured to stretch during drogue opening shock, and thus the riser has the potential to reduce the load spikes that are applied to the user (whether directly or indirectly). In accordance with some embodiments of the present disclosure, the shock energy may be dissipated over a longer period of time with a reduced peak loading. To achieve these and other benefits and functions, the drogue risers or bridles of the present disclosure are formed from a kinetic rope that is integrated into the ejection seat drogue system in a unique design to mate with drogue chute interfaces.

Figure 1B:
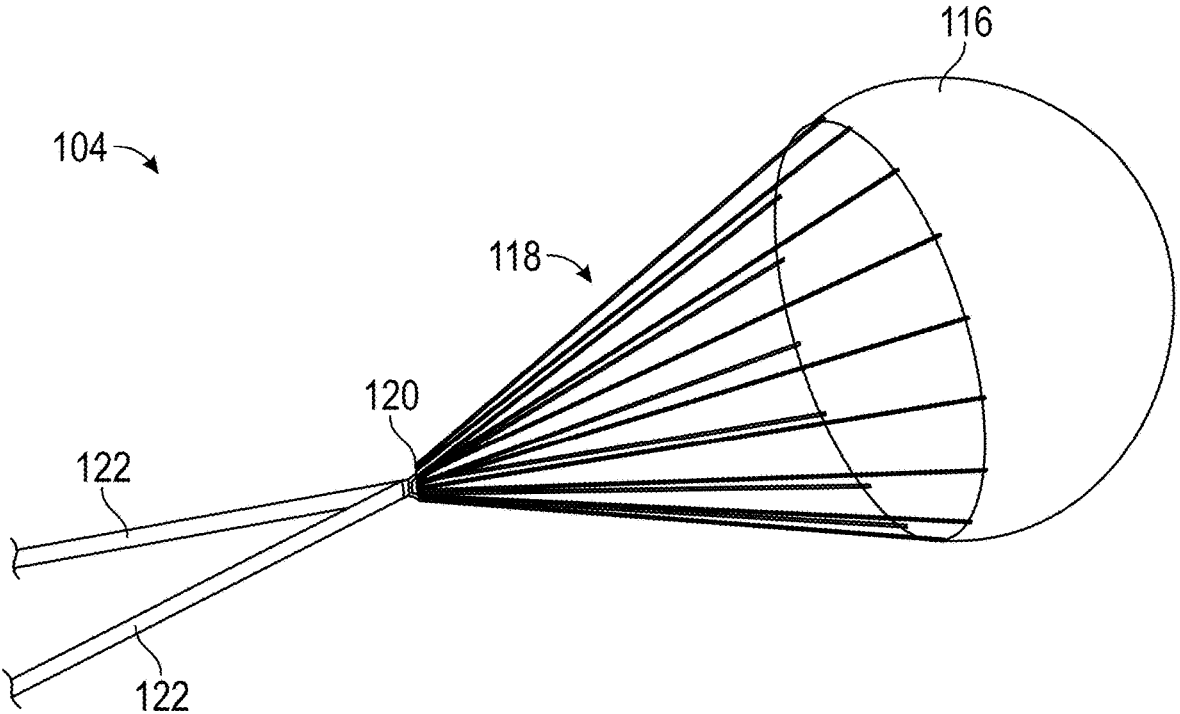
FIG. 1B is a schematic illustration of the drogue parachute system illustrating components thereof during deployment.

With reference to FIGS. 1A-1B, schematic illustrations of an aircraft ejection system 100 are shown. FIG. 1A illustrates the aircraft ejection system 100 relative to an aircraft 102, and FIG. 1B illustrates a drogue parachute assembly 104 of the aircraft ejection system 100 in a deployed state. As illustrated in FIG. 1A, the aircraft ejection system 100 may be installed in or on the aircraft 102 to safely expel an ejection seat 106 and an occupant 108 of the ejection seat 106 from a cockpit 110 of the aircraft 102. The ejection seat 106 may be urged from the cockpit 110 by a propulsion system 112. The aircraft ejection system 100 includes the drogue parachute assembly 104, which may be a multi-staged assembly or system. The drogue parachute assembly 104 may be configured to deploy at a predetermined time after initiation of an ejection sequence. The drogue parachute assembly 104, once deployed, may decelerate and stabilize the ejection seat 106 prior to deployment of a main parachute assembly 114, which may be located, at least partially, within ejection seat 106.

With reference to FIG. 1B, the drogue parachute assembly 104 is illustrated in a deployed state. The drogue parachute assembly 104, in this illustrative configuration, includes a drogue canopy 116, a plurality of suspension lines 118, a riser connection 120, and a set of risers 122, which may coupled to the ejection seat 106.

Upon deployment of the drogue parachute assembly 104, the drogue canopy 116 will deploy and inflate to increase drag, or otherwise decelerate, the ejection seat 106. The drogue canopy 116 may be configured as any suitable type of canopy and may be made from any suitable type of material, such as, for example, canvas, silk, nylon, aramid fiber, polyethylene terephthalate, and/or the like. The suspension lines 118 may be coupled to the drogue canopy 116 using any suitable attachment technique, such as, for example, through stitching. The suspension lines 118 may be configured to at least partially stabilize the deployed drogue canopy 116. The suspension lines 118 may connect to or join with the risers 122 at the riser connection 120 or, in some configurations, the material of the suspension lines 118 may be woven or otherwise bound to one another to transition into forming the risers 122, with the transition occurring at the riser connection 120. In this regard, the suspension lines 118 and risers 122 connect the ejection seat 106 to the drogue canopy 116. The suspension lines 118 and/or the risers 122 may be formed from any suitable material. For example, the suspension lines 118 and/or risers 122 may be arranged as a tubular braided material that constricts in diameter under tension, such as, for example, nylon, aramid fiber, and/or the like.

The drogue parachute assembly 104 may be configured to enable staged deployment. For example, at a first deployment stage, the drogue canopy 116 is reefed and the drogue canopy may inflate to a first diameter, which may be relatively small to reduce opening loads. Subsequently, at a second deployment stage, the reefing line is cut and the drogue canopy 116 inflates to a second, larger diameter. The rate of change in force during the inflation load spike can lead to injury and/or other damage to the users and/or components of the system. Accordingly, it may be advantageous to reduce shock through an extendable or stretchable set of risers 122 or the like.

For example, in accordance with some embodiments of the present disclosure, the risers 122 may be elastic risers formed from a kinetic rope or similar material. The elastic riser is made to stretch under the application of forces (e.g., deceleration forces applied by inflating drogue canopy 116). As used herein, the term elastic riser refers to elastic or stretchable material that may increase in length due to application of loads and thus stretch from an initial length to an increased length. For example, the term "elastic riser" as used herein refers to a riser formed of a material with an elongation greater than 15% under load. Materials of such elastic risers may include, without limitation, kinetic rope, elastic bungee cord, bungee jumping cord, rubber, braided nylon and polyester, or the like. As the elastic riser stretches during the opening shock of the drogue canopy 116, the total load spike will be reduced and extended over a longer period of time as compared to a more rigid riser and/or suspension line material that does not stretch. That is, the shock energy of the deployment of the drogue parachute assembly 104 is dissipated over a longer period with a reduced peak loading as compared to prior systems. For example, and without limitation, in accordance with some embodiments of the present disclosure, an acceleration may be reduced by 15% or greater and a shock response time may be smoothed (e.g., extended) by 20%, as compared to systems that do not include such elastic riser configurations.

Figure 2:
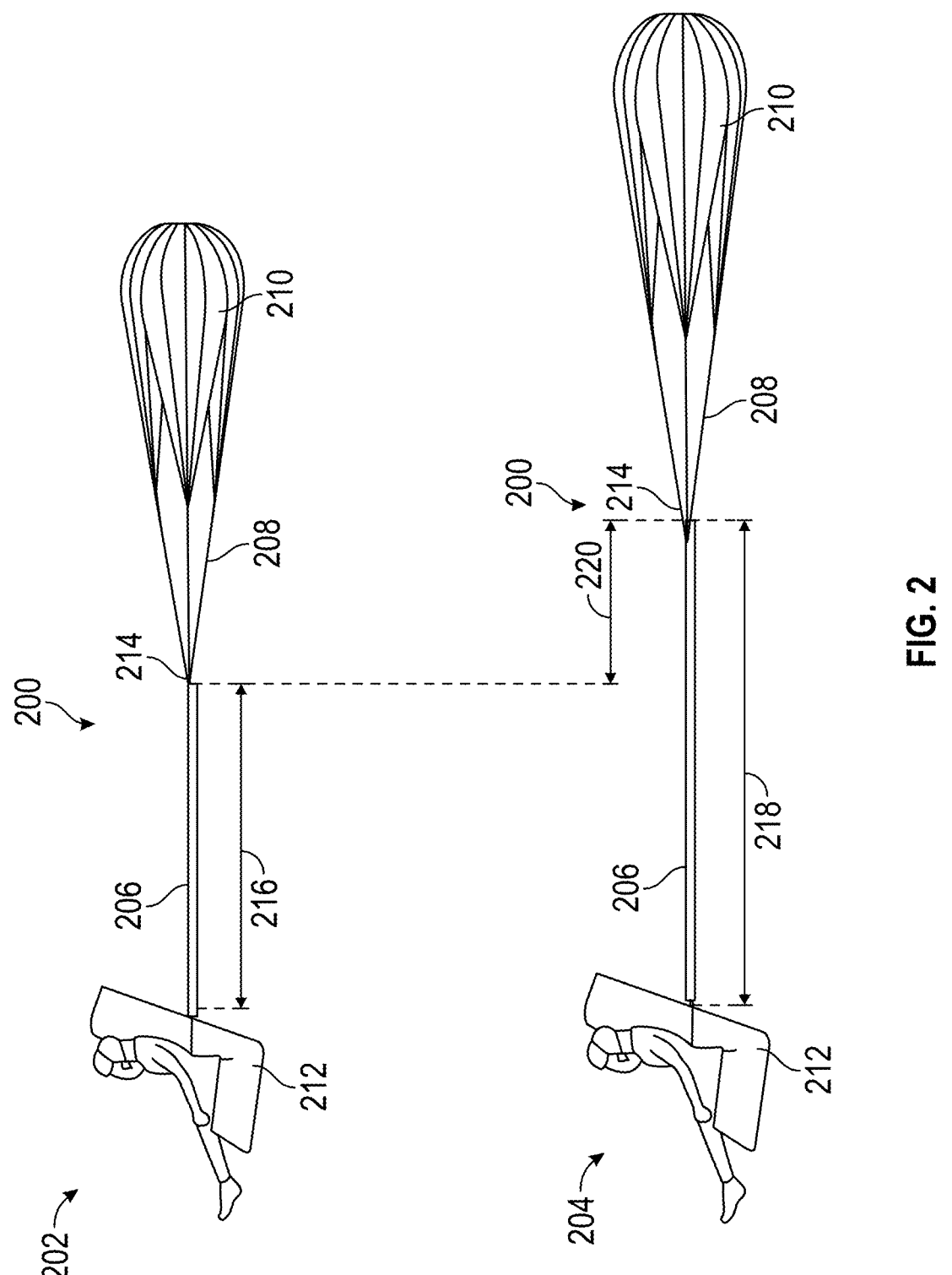
FIG. 2 is a schematic illustration of a drogue parachute system in accordance with an embodiment of the present disclosure, including an elastic riser arranged between an ejection seat and a drogue parachute and illustrating extension in length thereof.

Referring now to FIG. 2, a schematic illustration of a drogue parachute system 200 comparing a first deployment state 202 and a second deployment state 204. The drogue parachute system 200 may be similar to that shown and described above with respect to FIGS. 1A-1B. The drogue parachute system 200 includes an elastic riser 206 that connects to a set of suspension lines 208 that in turn connect to a drogue canopy 210. Although shown in FIG. 2 as a single line, it will be appreciated that the elastic riser 206 may be formed of two lines, cables, straps, or the like, that extend from an ejection seat 212 to a riser connection 214, where the two elements connect or join at a single point with the suspension lines 208.

Before deployment (e.g., when installed within an aircraft), the drogue parachute system 200 may be stowed within or as part of the ejection seat 212 that is part of an aircraft (e.g., as shown in FIG. 1A). When the ejection seat 212 is first ejected from an aircraft during an ejection event, the drogue parachute system 200 will deploy to the first deployment state 202. In the first deployment state 202, the elastic riser 206 extends a first length 216, and the suspension lines 208 and drogue canopy 210 will extend therefrom. As the elastic riser 206 reaches the first length 216, the drogue canopy 210 will fill with air and apply drag and a backward force that can induce a shock. However, because the elastic riser 206 is formed from a kinetic rope material or other stretchable materials, such as bungee cord material or bungee jumping cord material (e.g., elastic strands covered in a nylon or cotton sheath), the elastic riser 206 may continue to extend and lengthen. For example, as shown in FIG. 2, in the second deployment state 204, the elastic riser 206 has extended to a second length 218 that is longer than the first length 216. That is, during the transition from the first deployment state 202 to the second deployment state 204, the elastic riser 206 may increase in total length by a differential length 220 that is the difference between the second length 218 and the first length 216.

The differential length 220 may be at least a 15% increase in length in the elastic riser 206 from first (unstretched) length 216 to the second (stretched) length 218. That is, the second length 218 may be at least 15% longer than the first length 216. An increase of about 20% in length may be provided by the elastic riser 206 being formed of a kinetic rope material. Stated another way, using an elastic riser 206 formed from elastic materials such as kinetic rope or bungee material, the differential length 220 may be about 15% of the first length 216 (i.e., total length of 115% or greater). In some embodiments, the second length 218 may be double the first length 216 or greater. It will be appreciated that the extension provided by the riser may be an increase in length of 15% or more at the time of the initial drogue opening shock, thus providing for an extended time of shock force application, thereby reducing the instantaneous shock that may be experienced by a user in the ejection seat 212. As such the transfer of momentum from the drogue canopy 210 to the ejection seat 212 (and thus a user in the ejection seat 212) may be slowed and extended over a period of time greater than in systems that use conventional aramid fiber riser. For example, as noted above, the initial shock in an aramid fiber riser system may be experienced over a period of about 0.02 second to about 0.05 seconds. In contrast, by implementing a riser configuration as described herein, using kinetic rope or bungee cord materials, the shock may be distributed over a period about 0.05 to 0.15 second, or longer. In some embodiments, the extended time of force application may be 2-3 times, or greater, than the time of shock application of a conventional system. Although described with an increase in length of at least 15%, in accordance with embodiments of the present disclosure, the increase in length provided by the elastic riser may be 15% or greater, 20% or greater, 50% or greater, double the length, or other increased lengths that are a minimum of 15% in total length under load.

Although FIG. 2 illustrates a specific arrangement of components, the specific order of elements may be changed without departing from the scope of the present disclosure. For example, in some embodiments, conventional riser material (e.g., non-elastic aramid fiber) may be provided within the system without departing from the scope of the present disclosure. In some such embodiments, the conventional riser material may be arranged to provide an operable connection between the ejection seat 212 and the elastic riser 206. In other embodiments, the conventional riser material may be arranged to provide an operable connection between the elastic riser 206 and the riser connection 214. In still further embodiments, the span between the ejection seat 212 and the riser connection 214 may be formed of multiple segments with at least one portion of the span defined by an elastic riser or similar material structure.

In accordance with some embodiments, additional extension of time and reduction of shock forces may be provided through the addition of an attenuation system applied to an existing drogue system. That is, in accordance with some embodiments of the present disclosure, the connection between the drogue parachute and an ejection seat may be modified to reduce deceleration spikes during drogue parachute deployment by including an attenuation system as shown and described herein.

Figure 3:
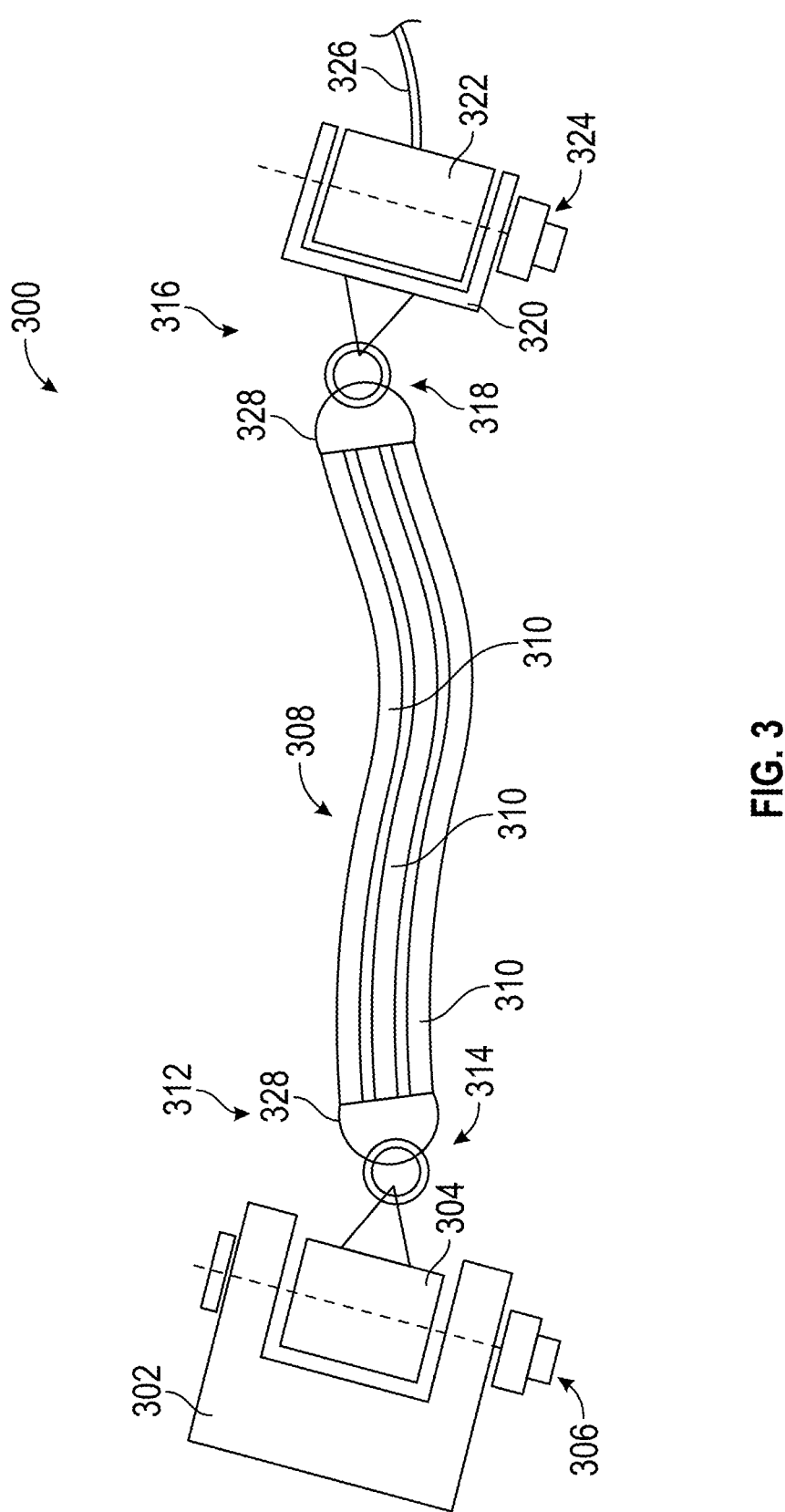
FIG. 3 is a schematic illustration of a drogue parachute attenuation system in accordance with an embodiment of the present disclosure.

For example, referring now to FIG. 3, a schematic illustration of a drogue parachute attenuation system 300 in accordance with an embodiment of the present disclosure is shown. The drogue parachute attenuation system 300 may be used with the drogue parachute systems shown and described above. Alternatively, the drogue parachute attenuation system 300 may be used with a conventional aramid fiber riser system. The drogue parachute attenuation system 300 includes a housing 302 that is configured to be attached to and mounted within a portion of an ejection seat. Arranged within the housing 302 is an attenuator bushing 304. The attenuator busing 304 is secured within the housing 302 by a first fastener assembly 306. The first fastener assembly 306 may include a bolt and nut, although other types of fasteners or securing mechanisms may be employed without departing from the scope of the present disclosure.

Attached to the attenuator bushing 304 is an attenuation element 308. The attenuation element 308 may be formed from one or more structural elements, such as cables, ropes, or the like, which have an elastic property that allows for extension or stretching of the attenuation element 308. In accordance with embodiments of the present disclosure, the attenuation element 308 is configured to provide for a minimum elongation or change in length of at least 15% when under load. As shown, the attenuation element 308 is formed from three cables 310. The cables 310 may be formed from kinetic rope, bungee cord material, bungee jumping cord material, or the like, similar to the elastic riser of FIG. 2. At a first end 312 of the attenuation element 308, the attenuation element 308 attaches to the attenuator bushing 304 by a first connector 314. The first connector 314 may include various elements and components to securely attach the attenuator element 308 to the attenuator bushing 304 and thus securely attach the attenuator element 308 to an ejection seat.

At a second end 316 of the attenuator element 308 is a second connector 318. The second connector 318 may be substantially similar to the first connector 314. The second connector 318 attaches the attenuator element 308 at the second end 316 to an attenuator coupling 320. A riser bushing 322 is secured within the attenuator coupling 320 by a second fastener assembly 324. The riser bushing 322 is attached to a riser 326, which may be an aramid fiber riser or may be an elastic riser, such as shown and described above. A set of suspension lines and a drogue canopy (not shown) are attached to the riser 326.

The drogue parachute attenuation system 300 provides an aircraft ejection system with an additional mechanism to reduce shock applied to a user of the ejection system. By incorporating the drogue parachute attenuation system 300, the riser bushing 322 may be offset from the ejection seat (located at the housing 302) by an additional length, which may be adjustable or elastic. As such, a smooth and controlled maximum deceleration of the ejection seat may be achieved, thus reducing, minimizing, or eliminating dangerous or injurious shock forces to be applied to a human body. In accordance with a non-limiting embodiment, the cables 310 of the attenuator element 308 may be one inch (1") diameter bungee cables or cords. In other configurations, the cables 310 may be formed from kinetic rope, bungee cord material, bungee jumping cord material, or other elastic rope/cable materials, or the like. Further, although shown with three cables 310, in other configurations, a single cable may be employed, or any number of cables of one or more may be employed without departing from the scope of the present disclosure.

As illustrated in FIG. 3, the first and second connectors 314, 318 are illustrated in a particular configuration. For example, as illustrated the cables 310 may be joined to the respective attenuator bushing 304 and attenuator coupling 320 by rings 328, looped straps, secured with ropes, or the like. The rings 328 may be fixed and securely attached to each of the cables 310 and provide a secure connection to the respective attenuator bushing 304 and attenuator coupling 320. Each of the elements of the connectors 314, 318 may be substantially free to move relative to each other such that the cables 310 do not become entangled and to allow for various movements and applications of force during drogue deployment, without breaking or becoming a hazard. It will be appreciated that other types of connectors and connection means and mechanisms may be employed without departing from the scope of the present disclosure.

Figure 4:
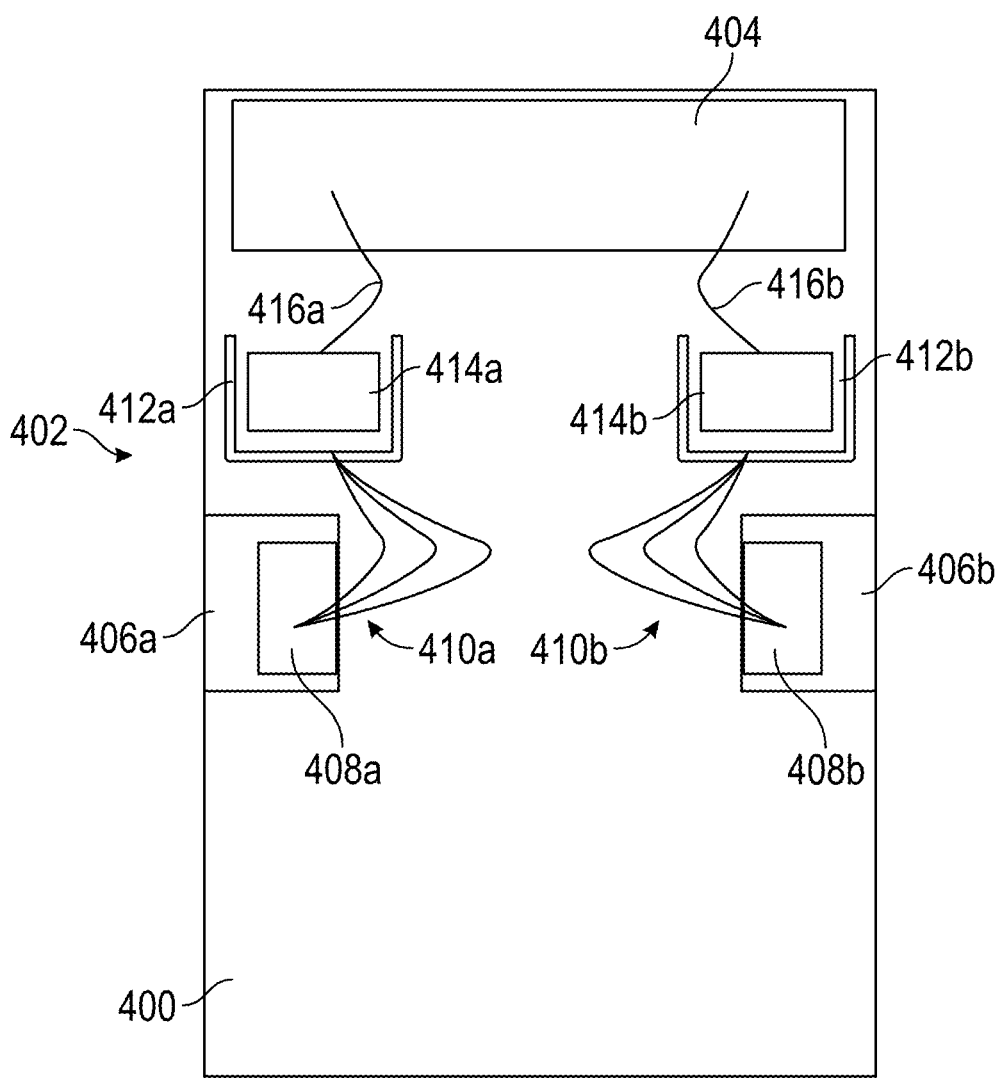
FIG. 4 is a schematic illustration of an ejection seat having a drogue parachute attenuation system in accordance with an embodiment of the present disclosure.

Referring now to FIG. 4, a schematic illustration of an ejection seat 400 having a drogue parachute attenuation system 402 installed thereon, in accordance with an embodiment of the present disclosure. The drogue parachute attenuation system 402 may be similar to the above described systems. The drogue parachute attenuation system 402 provides a connection between the ejection seat 400 and a drogue parachute, which is stowed in a drogue parachute box 404 arranged at a top of the ejection seat 400, in this example configuration.

The drogue parachute attenuation system 402 is arranged with two sets of components, as will be appreciated by those of skill in the art. Accordingly, along one side of the ejection seat 400 is a first housing 406a and along another side of the ejection seat 400 is a second housing 406b. The housings 406a-b provide a fixed connection between the drogue parachute attenuation system 402 and the ejection seat 400. Arranged within each housing 406a-b is a respective attenuator bushing 408a-b. Attached to each attenuator bushing 408a-b is a respective attenuation element 410a-b. The attenuation elements 410a-b may be formed from one or more structural elements, such as cables, ropes, or the like, which have an elastic property that allows for extension or stretching of the attenuation elements 410a-b. The components or elements of the attenuation elements 410a-b may be formed from kinetic rope, bungee cord material, bungee jumping cable, or the like, similar to the elastic risers described above. At an opposite end, the attenuation elements 410a-b connect to respective attenuator couplings 412a-b. A riser bushing 414a-b is secured within the respective attenuator couplings 412a-b, similar to that described with respect to FIG. 3. The riser bushings 414a-b are attached to respective risers 416a-b, which may be an aramid fiber riser or may be an elastic riser, such as shown and described above. A set of suspension lines and a drogue canopy (housed within the drogue parachute box 404) are attached to the risers 416a-b.

Advantageously, embodiments of the present disclosure are directed to ejection seat systems with drogue parachutes with improved operation and safety. For example, in accordance with some embodiments, an elastic riser is provided that connects between an ejection seat and a set of suspension lines that connect to a drogue canopy. The elastic riser is configured to stretch or extend from a first length at the time of deployment to a second length which extends the total length of the elastic riser as the drogue parachute fills with air and applies a force on the elastic riser and the ejection seat to which it is attached. The extension and stretching of the elastic riser causes the forces applied to a user (e.g., crew member) in the ejection seat to be dissipated over a period of time that is greater than conventional systems that employ aramid fiber risers or the like. In accordance with some embodiments, the elastic riser may be formed or made from any elastic material (e.g., elastic riser material having an elongation of at least 15% when under load). The reduced peak loading, achieved by distribution of the force of an extended period of time, may reduce injurious peak accelerations. Such reduction in peak acceleration may enable users (e.g., crew members) of lower weight (e.g., women, although not limited thereto) to use such ejection seat systems with reduced or eliminated risks associated with peak loading from conventional ejection seat systems. Advantageously, embodiments of the present disclosure provide for safe ejection and coverage for all pilot (or user) sizes (e.g., height, weight, etc.) with a single installation, without requiring different installations for differently sized pilots (or users).

Advantageously, in accordance with some embodiments, further reductions in acceleration and/or peak load may be provided through a staggered drogue parachute deployment system. For example, in accordance with some embodiments, an attenuation element may be arranged between the drogue risers and the ejection seat, further attenuating the distribution of forces/acceleration over a longer period of time, thus reducing peak forces/acceleration applied to a user. The attenuation element may offset existing drogue riser attachments by incorporating the attenuation element between the ejection seat structure and the riser that attaches to the drogue parachute. This additional attenuation element provides for a smooth and controlled max deceleration of the ejection seat. This may reduce or prevent deceleration spikes during drogue parachute deployment. Accordingly, reductions in risks and loads applied to or experienced by a user's head, neck, and spinal chord may be achieved.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A drogue parachute system comprising:
an ejection seat;
an elastic riser operably connected to the ejection seat at a first end and a riser connection is arranged at a second end of the elastic riser;
a set of suspension lines operably connected to the riser connection; and
a drogue canopy attached to the set of suspension lines opposite the riser connection.

2. The drogue parachute system of claim 1, wherein the elastic riser is formed from kinetic rope.

3. The drogue parachute system of claim 1, wherein the elastic riser is formed from bungee cord material or bungee jumping cord material.

4. The drogue parachute system of claim 1, wherein the elastic riser is configured to extend from a first length to a second length during deployment of the drogue canopy.

5. The drogue parachute system of claim 4, wherein the second length is a length that is at least 15% greater than the first length.

6. The drogue parachute system of claim 1, wherein the elastic riser is operably connected to the ejection seat via an aramid fiber cable.

7. The drogue parachute system of claim 1, wherein the elastic riser is operably connected to the set of suspension lines via an aramid fiber cable.

8. The drogue parachute system of claim 1, further comprising a drogue parachute attenuation system disposed between and connecting the elastic riser to the ejection seat.

9. The drogue parachute system of claim 8, wherein the drogue parachute attenuation system comprises at least one attenuation element connected between the ejection seat and the elastic riser.

10. The drogue parachute system of claim 9, wherein the drogue parachute attenuation system comprises:

an attenuator bushing attached to the ejection seat; and an attenuator coupling attached to the elastic riser, wherein the at least one attenuation element extends between the attenuator bushing and the attenuator coupling.

11. The drogue parachute system of claim 10, wherein the drogue parachute attenuation system further comprises:

a first connector configured to attach the attenuator bushing to the at least one attenuation element; and a second connector configured to attach the at least one attenuation element to the attenuator coupling.

12. The drogue parachute system of claim 9, wherein the at least one attenuation element is made of kinetic rope.

13. The drogue parachute system of claim 9, wherein the at least one attenuation element is made of bungee cord material or bungee jumping cord material.

14. A drogue parachute system comprising:

an ejection seat;

a riser;

a set of suspension lines;

a drogue canopy, wherein the drogue canopy is attached at a first end of the set of suspension lines and the riser is attached to a second end of the suspension lines; and a drogue parachute attenuation system arranged between the riser and the ejection seat, the drogue parachute attenuation system comprising:

an attenuator bushing attached to the ejection seat;

an attenuator coupling attached to the riser; and at least one attenuator element attached between the attenuator bushing and the attenuator coupling.

15. The drogue parachute system of claim 14, wherein the at least one attenuator element is formed from kinetic rope.

16. The drogue parachute system of claim 14, wherein the at least one attenuator element is formed from bungee cord material or bungee jumping cord material.

17. The drogue parachute system of claim 14, wherein the at least one attenuator element comprises a plurality of cables.

18. The drogue parachute system of claim 14, wherein the drogue parachute attenuation system further comprises:

a first connector configured to attach the attenuator bushing to the at least one attenuation element; and a second connector configured to attach the at least one attenuation element to the attenuator coupling.

19. The drogue parachute system of claim 14, wherein the riser is made of kinetic rope.

20. The drogue parachute system of claim 14, wherein the riser is made of bungee cord material or bungee jumping cord material.

* * * * *